(12) United States Patent
Nishizaki et al.

(10) Patent No.: US 6,450,592 B1
(45) Date of Patent: Sep. 17, 2002

(54) MOTOR VEHICLE BRAKING SYSTEM

(75) Inventors: Katsutoshi Nishizaki, Nabari; Shiro Nakano, Osaka; Masaya Segawa, Tenri; Ryouhei Hayama, Nabari; Kazuhiro Kato, Itami, all of (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/873,307

(22) Filed: Jun. 5, 2001

(30) Foreign Application Priority Data

Jun. 22, 2000 (JP) ........................................ 2000-188133

(51) Int. Cl.[7] .............................. B60T 8/60; G06F 19/00
(52) U.S. Cl. .......................................... 303/155; 701/41
(58) Field of Search ................... 364/424.051, 426.02, 364/426.03, 424.047; 180/167, 168, 197; 701/38, 39, 41; 303/140, 146, 155, 185, 1, 190

(56) References Cited

U.S. PATENT DOCUMENTS

| | | | | |
|---|---|---|---|---|
| 5,379,222 A | * | 1/1995 | Anan et al. ............ 364/426.03 |
| 5,428,532 A | * | 6/1995 | Yasuno ................... 364/424.05 |
| 5,684,699 A | * | 11/1997 | Sugiyama ............ 364/424.051 |
| 5,732,371 A | * | 3/1998 | Fujita ........................... 701/38 |
| 5,762,157 A | * | 6/1998 | Uehara ....................... 180/197 |
| 6,131,688 A | * | 10/2000 | Fukada ........................ 180/408 |
| 6,219,604 B1 | * | 1/2001 | Dilger et al. ................. 701/41 |
| 6,226,279 B1 | * | 5/2001 | Hackl .......................... 701/41 |

* cited by examiner

*Primary Examiner*—Christopher P. Schwartz
(74) *Attorney, Agent, or Firm*—Rabin & Berdo, P.C.

(57) ABSTRACT

A braking system for a motor vehicle is provided, which has an attitude control function. The system includes: a first attitude control circuit for stabilizing the behavior of the motor vehicle by controlling the operation of a steering mechanism of the motor vehicle; a second attitude control circuit for stabilizing the behavior of the motor vehicle by controlling a braking mechanism for applying a braking force to vehicle wheels of the motor vehicle; and a braking control circuit for causing the braking mechanism to generate a maximum braking force on condition that an attitude control is performed for the stabilization of the behavior of the motor vehicle by the first attitude control circuit when a braking command is inputted thereto.

2 Claims, 3 Drawing Sheets

MOTOR VEHICLE BRAKING SYSTEM

BACKGROUND OF THE INVENTION

1. Field of the Invention

The present invention relates to a motor vehicle braking system which is capable of performing a braking operation while controlling the attitude of a motor vehicle.

2. Description of Related Art

One technique for attitude control of a motor vehicle is to utilize an ABS system (anti-lock braking system) for independently controlling braking pressures on four vehicle wheels. That is, the yaw rate or lateral acceleration of the motor vehicle is controlled by the independent control of the braking pressures on the four vehicle wheels, thereby preventing attitude instability of the motor vehicle. Particularly on a low friction road surface such as an iced road surface, the attitude control through the control of the braking pressures (braking attitude control) is more effective than attitude control by a steering mechanism (steering attitude control).

The ABS system allows for an ideal braking operation while preventing the vehicle wheels from being locked to realize the minimum possible braking distance, when a braking pedal is heavily stepped down to apply a maximum braking command.

Where the behavior of the motor vehicle is to be stabilized on a so-called $\mu$-split road, however, it is impossible to generate a maximum braking force. The term "$\mu$-split road" herein means a road having significantly different friction coefficients with respect to left and right wheels of the motor vehicle. A typical case is such that the right wheels are on a dry asphalt road surface and the left wheels are on an iced road surface. When a greater braking pressure is applied to the vehicle wheels on a high $\mu$ (friction coefficient) side of the $\mu$-split road, a great yaw moment is generated thereby to cause the motor vehicle to easily spin. Therefore, the stabilization of the behavior of the motor vehicle should primarily be achieved by reducing the braking pressures to be applied to the vehicle wheels on the high $\mu$ side which can otherwise provide a greater braking force. Accordingly, there is no other way but to reduce the deceleration, whereby the braking distance and the braking time are increased.

SUMMARY OF THE INVENTION

It is an object of the present invention to provide a motor vehicle braking system which is capable of advantageously performing a braking operation on a $\mu$-split road.

The motor vehicle braking system according to the present invention comprises: a first attitude control circuit (20) for stabilizing the behavior of a motor vehicle by controlling the operation of a steering mechanism (2,3) of the motor vehicle; a second attitude control circuit (60) for stabilizing the behavior of the motor vehicle by controlling a braking mechanism (53,54) for applying a braking force to vehicle wheels of the motor vehicle; and a braking control circuit (60) for causing the braking mechanism to generate a maximum braking force on condition that an attitude control is performed for the stabilization of the behavior of the motor vehicle by the first attitude control circuit when a braking command is inputted thereto. Parenthesized alpha-numeric characters denote corresponding components to be described later in the embodiment of the invention, but do not intend to limit the invention to the embodiment. This definition is effectual in this section.

With the aforesaid arrangement, a braking operation is performed by the generation of the maximum braking force in response to the input of the braking command on condition that the behavior of the motor vehicle is stabilized through the control of the steering mechanism. Thus, the motor vehicle is decelerated at a higher rate with the attitude thereof being stabilized through the attitude control operation, whereby the braking distance and the braking time can be reduced.

The steering mechanism preferably has no mechanical connection to a steering operation member (1) such as a steering wheel, or is adapted to be brought out of mechanical engagement with the steering operation member as required. With this arrangement, the steering mechanism can electrically be controlled in accordance with the operation of the steering operation member, whereby a steering control can be performed as intended by a driver and the behavior of the motor vehicle can easily be stabilized through the steering control independent of the operation of the steering operation member. For example, a target yaw rate or a target lateral acceleration is determined in accordance with the operation torque or operation angle of the steering operation member, and the attitude control of the motor vehicle can be achieved by electrically controlling the operation of the steering mechanism on the basis of the target yaw rate or the target lateral acceleration.

The foregoing and other objects, features and effects of the present invention will become more apparent from the following description of the preferred embodiments with reference to the attached drawings.

DESCRIPTION OF THE PREFERRED EMBODIMENTS

Figure 1:
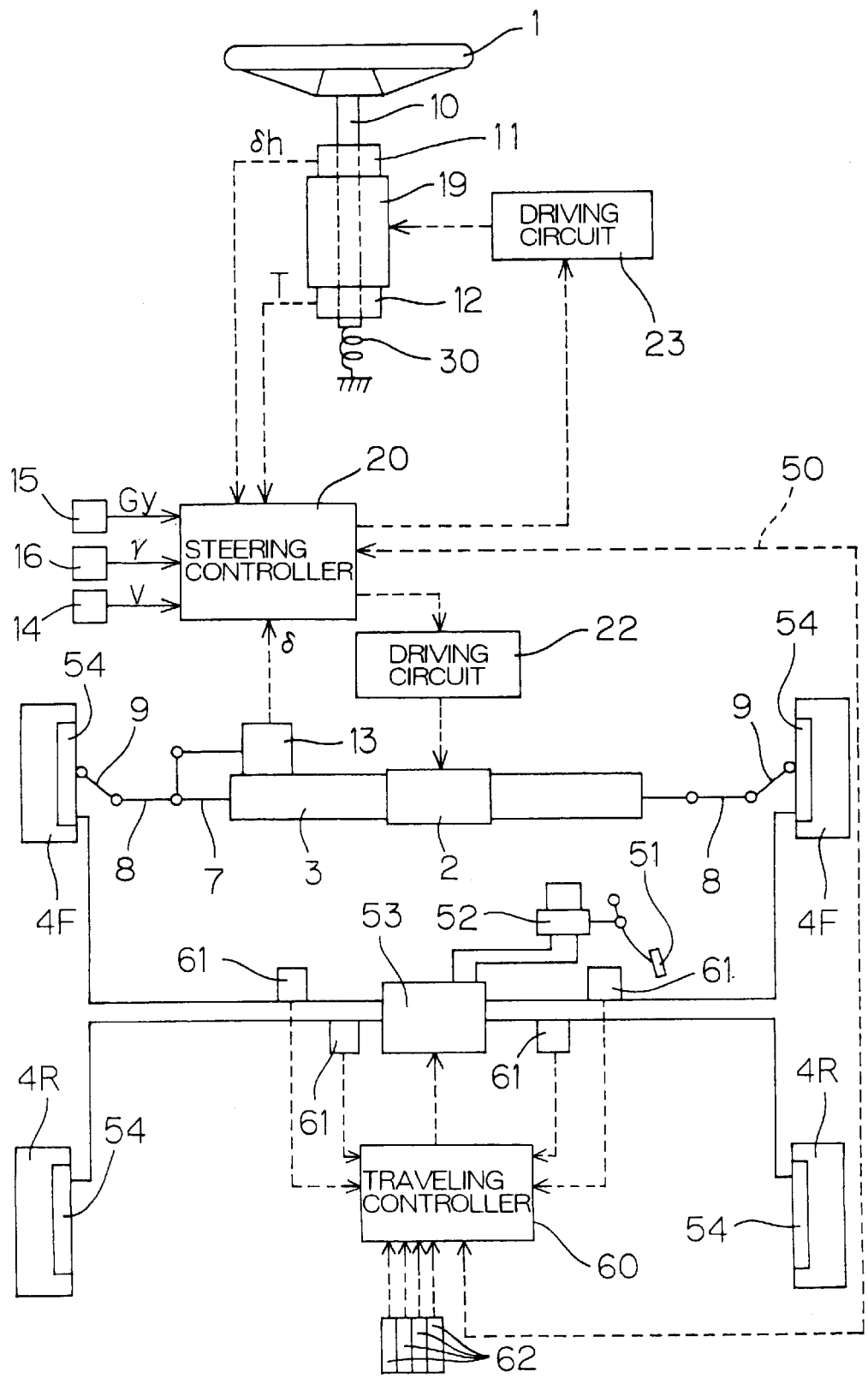
FIG. 1 is a conceptual diagram for explaining the basic construction of a motor vehicle braking system according to one embodiment of the present invention.

FIG. 1 is a conceptual diagram for explaining the basic construction of a braking system for a motor vehicle in accordance with one embodiment of the present invention. The motor vehicle braking system cooperates with a motor vehicle steering system for stabilization of the behavior of the motor vehicle and for improvement of a braking operation for the motor vehicle.

The motor vehicle steering system converts the motion of a steering actuator 2 driven in accordance with the turning operation of a steering wheel (steering operation member) 1 into the turning motion of left and right front wheels (steerable vehicle wheels) 4F via a steering gear 3. Thus, a steering operation is achieved with no mechanical coupling between the steering wheel 1 and the steering gear 3 In this case, the steering actuator 2, the steering gear 3 and the like constitute a steering mechanism.

The steering actuator 2 may be constituted, for example, by a known electric motor such as a brushless motor.

The steering gear 3 has a motion converting mechanism (ball thread mechanism or the like) for converting the rotational motion of an output shaft of the steering actuator 2 into the linear axial motion of a steering rod 7 (traverse to the motor vehicle). The motion of the steering rod 7 is transmitted to knuckle arms 9 via tie rods 8 to turn the knuckle arms 9. Thus, the wheels 4F supported by the knuckle arms 9 are turned.

The steering wheel 1 is coupled to a rotation shaft 10 rotatably supported with respect to the motor vehicle. The rotation shaft 10 is provided with a counter force actuator 19 for applying a counter steering force to the steering wheel 1. More specifically, the counter force actuator 19 may be constituted by an electric motor such as a brushless motor having an output shaft provided integrally with the rotation shaft 10.

A resilient member 30 such as a coil spring is provided between the motor vehicle and an end of the rotation shaft 10 opposite from the steering wheel 1 for connection therebetween. The resilient member 30 returns the steering wheel 1 to a straight traveling steering position by its resilient force when the counter force actuator 19 applies no torque to the steering wheel 1.

For detection of an operation input value indicative of the degree of the operation of the steering wheel 1, the rotation shaft 10 is provided with an angle sensor 11 for detecting an operation angle δh corresponding to the rotation angle of the rotation shaft 10. The rotation shaft 10 is further provided with a torque sensor 12 for detecting an operation torque T applied to the steering wheel 1.

A steering angle sensor 13 for detecting a steering angle μ of the wheels 4F is provided as an output value sensor for detecting an output value of the steering actuator 2. The steering angle sensor 13 may be constituted by a potentiometer or the like which detects the amount of the movement of the steering rod 7 moved by the steering actuator 2.

The angle sensor 11, the torque sensor 12 and the steering angle sensor 13 are connected to a steering controller 20 (first attitude control circuit, steering control circuit) including a computer (ECU: electronic control unit).

The steering controller 20 controls the steering actuator 2 and the counter force actuator 19 via driving circuits 22 and 23, respectively. The steering controller 20 is further connected to a lateral acceleration sensor 15 for detecting a lateral acceleration Gy of the motor vehicle, a yaw rate sensor 16 for detecting a yaw rate γ of the motor vehicle, and a speed sensor 14 for detecting the speed V of the motor vehicle.

The steering controller 20 communicates with a traveling controller 60 (second attitude control circuit) for controlling the braking of the motor vehicle via a communication line 50 for data transmission. Data indicative of the lateral acceleration Gy, the yaw rate γ and the vehicle speed V respectively detected by the lateral acceleration sensor 15, the yaw rate sensor 16 and the speed sensor 14 are utilized in the steering controller 20, and transmitted to the traveling controller 60 via the communication line 50.

A braking pressure is generated by a master cylinder 52 in accordance with a stepping force applied onto a braking pedal 51. The braking pressure is amplified and distributed to braking devices 54 (braking mechanism) of the front wheels 4F and rear wheels 4R by a braking pressure control unit 53 (braking mechanism), whereby the respective braking devices 54 apply braking forces to the wheels 4F, 4R. Then, the braking pressure control unit 53 is controlled by the traveling controller 60 constituted by a computer (ECU) to independently control braking pressures to be applied to the respective wheels 4F, 4R.

The traveling controller 60 is connected not only to the steering controller 20 but also to braking force sensors 61 for independently detecting the braking forces applied to the respective wheels 4F, 4R and to wheel speed sensors 62 for independently detecting the rotation speeds of the respective wheels 4F, 4R.

The traveling controller 60 controls the braking pressure control unit 53 for the amplification and distribution of the braking pressure on the basis of the rotation speeds of the respective wheels 4F, 4R detected by the wheel speed sensors 62 and feedback values applied from the braking force sensors 61. Thus, the braking forces to be applied to the respective wheels 4F, 4R are independently controlled. The braking pressure control unlit 53 is arranged so that the braking pressure can be generated by a built-in pump even if the braking pedal 51 is not operated.

The steering controller 20 and the traveling controller 60 respectively perform attitude control operations for stabilization of the behavior of the motor vehicle. That is, the steering controller 20 controls the steering actuator 2 for the stabilization of the behavior of the motor vehicle. More specifically, a target yaw rate is calculated on the basis of the operation angle δh of the steering wheel 1, and the direction of the front, wheels 4F is controlled so as to converge the actual yaw rate γ of the motor vehicle detected by the yaw rate sensor 16 at the target yaw rate.

On the other hand, the traveling controller 60 controls the braking pressures on the wheels located on an inner or outer side of the turning radius of the motor vehicle so as to converge the actual yaw rate γ of the motor vehicle at the target yaw rate γ for the attitude control of the motor vehicle.

Figure 2:
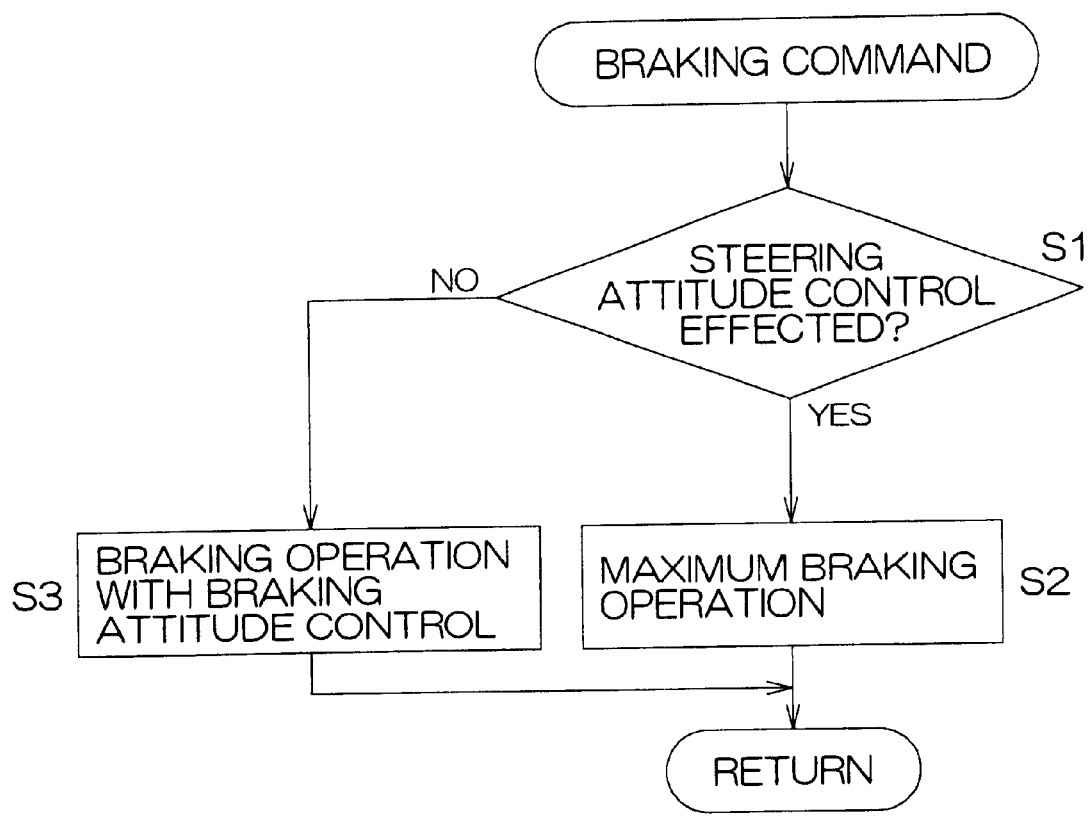
FIG. 2 is a flow chart for explaining an operation to be performed when a braking pedal is stepped down to provide a braking command.

FIG. 2 is a flow chart for explaining an operation to be performed when the braking pedal 51 is stepped down to provide a braking command. When the braking command is inputted by detecting the operation of the braking pedal 51 by a braking pedal switch not shown or by detecting the generated braking forces by the braking force sensors 61, the traveling controller 60 judges, with reference to information applied from the steering controller 20 via the communication line 50, whether or not the attitude control by the steering controller 20 is effected (Step S1).

If the attitude control by the steering controller 20 is effected, the traveling controller 60 suspends the attitude control through the control of the braking pressure or reduces an attitude control gain, and inputs a command signal to raise pressure to cause the braking pressure control unit 53 to generate the maximum braking force until the wheels each show a sign of locking (Step S2). Thus, the braking pressure control unit 53 is controlled to generate the maximum braking force while the attitude control is achieved through the control of the steering mechanism.

If the steering controller 20 does not perform the attitude control operation through the control of the steering mechanism when the braking command is inputted (NO in Step S1), the traveling controller 60 applies a control command to the braking pressure control unit 53 to perform the braking operation while stabilizing the behavior of the motor vehicle (Step S3). In this case, the maximum braking force is not necessarily generated depending on the state of a road surface.

Figure 3:
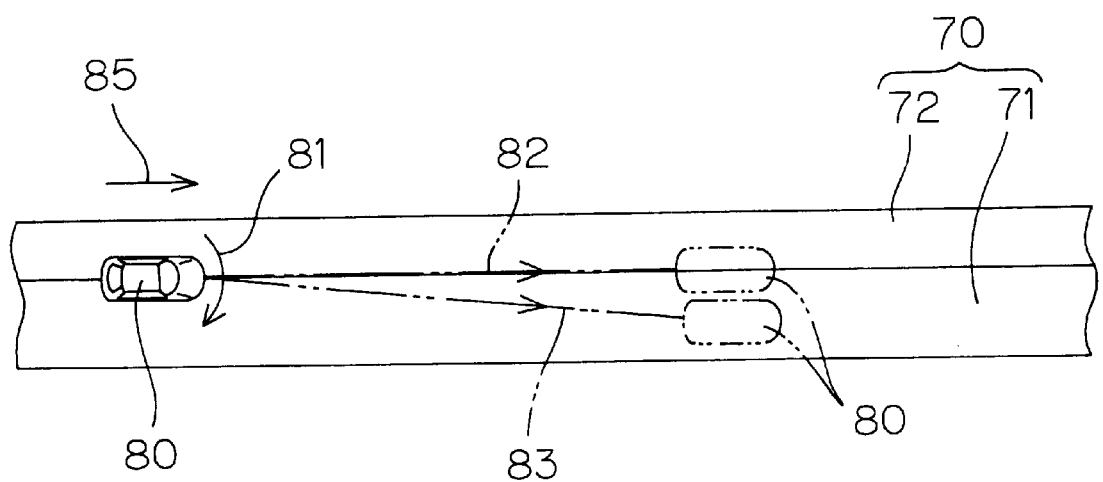
FIG. 3 is a schematic diagram for explaining how a braking operation is performed on a so-called $\mu$-split road.

FIG. 3 is a schematic diagram for explaining how the braking operation is performed on a so-called μ-split road. The μ-split road surface 70 has a high μ road surface 71 such as a dry asphalt road surface and a low μ road surface 72 such as an iced road surface, which are respectively located on the right side and the left side of the motor vehicle 80 with respect to a traveling direction 85.

When the braking pedal 51 is stepped down with the right wheels of the motor vehicle 80 being on the high μ road surface 71 and with the left wheels being on the low μ road surface 72, a yaw moment acts on the motor vehicle 80 in an direction of arrow 81. The steering controller 20 and the traveling controller 60 respectively perform the attitude control operations so as to counter-balance the yaw moment acting in the direction of arrow 81.

When the braking command is inputted with the braking pedal 51 stepped down, however, the traveling controller 60 temporarily suspends or attenuates the attitude control being performed by adjusting the braking force, on condition that the attitude control is performed by the steering controller 20. Then, the traveling controller 60 controls the braking pressure control unit 53 to generate the maximum braking force.

Where the steering wheel 1 is maintained as close as consciously possible to a neutral position during the braking operation, the motor vehicle 80 travels along a curved line 83 and stops on the high $\mu$ road surface 71 of the dry asphalt road surface. In an ordinary driving state, on the other hand, a driver operates the steering wheel 1 in an attempt to direct the motor vehicle 80 in the traveling direction 85. In this case, the motor vehicle 80 travels along a generally straight line as indicated by a reference character 82 and stops at a position across a boundary between the high $\mu$ road surface 71 and the low $\mu$ road surface 72.

Table 1 shows the results of an experiment conducted by the inventors of the present invention.

Shown in Table 1 are the deceleration, the braking distance and the braking time observed when the braking pedal 51 was stepped down to perform the braking operation on the motor vehicle 80 which was traveling at 50 km/h on the $\mu$-split road surface 70. At this time, a driver abruptly performed the braking operation while performing a correction steering operation to direct the motor vehicle 80 in the traveling direction 85 (i.e., the motor vehicle traveled along the line indicated by the reference character 82).

TABLE 1

|  | Deceleration (m/sec$^2$) | Braking distance (m) | Braking time (sec) |
|---|---|---|---|
| Maximum braking operation | 4.10 | 23.5 | 3.4 |
| Conventional braking operation | 3.50 | 27.6 | 4.0 |

In Table 1, the term "maximum braking operation" means case where the maximum braking force is applied to the motor vehicle 80 on the $\mu$-split road surface 70 through the operation shown in FIG. 2. The term "conventional braking operation" means a case where a command is applied to the braking pressure control unit 53 so as to perform the braking operation while performing the braking attitude control.

As can be understood from the results of the experiment shown in Table 1, the deceleration observed during the abrupt braking operation was significantly improved by employing the control operation according to this embodiment, and the braking distance and the braking time were correspondingly reduced.

In this experiment, the driver was able to perform the correction steering operation with sufficient leeway in the maximum braking operation as in the conventional braking operation. As a result, the driver was able to stably stop the motor vehicle with its head directing in the traveling direction and with its attitude kept stable.

In accordance with this embodiment, the traveling controller 60 applies the command signal to cause the braking pressure control unit 53 to generate the maximum braking force in the braking operation on condition that the steering controller 20 performs the attitude control. Thus, the motor vehicle can be stopped with a shorter braking distance without spinning even if the braking operation is performed on the $\mu$-split road. Hence, the safety of the motor vehicle is improved.

Where the maximum braking pressure is applied to the wheels 4F, 4R on the $\mu$-split road when the attitude control is not performed by the steering controller 20, the motor vehicle may easily be spun. In this embodiment, therefore, the braking operation is performed on the motor vehicle with the attitude control being performed by the traveling controller 60, when the steering controller 20 does not perform the attitude control. This prevents behavioral instability of the motor vehicle, thereby obviating a danger that the motor vehicle gets out of control.

While the embodiment of the present invention has thus been described, the invention may be embodied in any other ways. Although the embodiment described above is directed to a so-called steer-by-wire system which has no mechanical connection between the steering mechanism and the steering wheel 1, the present invention is applicable to a motor vehicle steering system in which a steering wheel 1 is mechanically coupled to a steering mechanism. For example, the attitude control of the motor vehicle can be achieved by controlling the steering angle of steerable wheels with the use of a power steering system adapted to apply a steering assist force to a steering mechanism. Further, the present invention is applicable to such an arrangement that a clutch is interposed between the steering wheel 1 and the steering mechanism to allow for mechanical coupling and decoupling therebetween as required.

Although the traveling controller 60 is operative as the ABS control system in the aforesaid embodiment, the traveling controller 60 is not necessarily required to be adapted for anti-lock braking control. That is, the invention is applicable to any cases where the traveling controller 60 is adapted to achieve the attitude control of the motor vehicle by adjusting the braking force.

While the present invention has been described in detail by way of the embodiment thereof, it should be understood that the foregoing disclosure is merely illustrative of the technical principles of the present invention but not limitative of the same. The spirit and scope of the present invention are to be limited only by the appended claims.

This application corresponds to Japanese Patent Application No. 2000-188133 filed to the Japanese Patent Office on Jun. 22, 2000, the disclosure thereof being incorporated herein by reference.

What is claimed is:

1. A braking system for a motor vehicle, comprising:
   a first attitude control circuit stabilizing a behavior of the motor vehicle by controlling an operation of a steering mechanism of the motor vehicle;
   a second attitude control circuit for stabilizing the behavior of the motor vehicle by controlling a braking mechanism for applying a braking force to vehicle wheels of the motor vehicle; and
   a braking control circuit for causing the braking mechanism to generate a maximum braking force on condition that an attitude control is performed for stabilization of the behavior of the motor vehicle by the first attitude control circuit when a braking command is inputted thereto.

2. A motor vehicle braking system as set forth in claim 1, wherein the steering mechanism has no mechanical connection to a steering operation member, or is adapted to be brought out of mechanical engagement with the steering operation member.

* * * * *